(12) United States Patent
Aciicmez et al.

(10) Patent No.: US 8,112,634 B2
(45) Date of Patent: Feb. 7, 2012

(54) SECURITY-ENHANCED STORAGE DEVICES USING MEDIA LOCATION FACTOR IN ENCRYPTION OF HIDDEN AND NON-HIDDEN PARTITIONS

(75) Inventors: Onur Aciicmez, San Jose, CA (US); Xinwen Zhang, San Jose, CA (US); Jean-Pierre Seifert, San Jose, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 917 days.

(21) Appl. No.: 12/132,862

(22) Filed: Jun. 4, 2008

(65) Prior Publication Data

US 2009/0319801 A1  Dec. 24, 2009

(51) Int. Cl.
*G06F 11/30* (2006.01)
*G06F 12/14* (2006.01)

(52) U.S. Cl. ........ 713/189; 713/190; 713/191; 713/192; 713/193; 713/194

(58) Field of Classification Search .................... None
See application file for complete search history.

(56) References Cited

U.S. PATENT DOCUMENTS

| | | | |
|---|---|---|---|
| 7,284,133 B2 * | 10/2007 | Watanabe et al. | 713/189 |
| 7,673,155 B2 * | 3/2010 | Hashimoto et al. | 713/194 |
| 7,721,325 B2 * | 5/2010 | Lee et al. | 726/4 |
| 7,899,186 B2 * | 3/2011 | Thibadeau | 380/277 |
| 2004/0172538 A1 * | 9/2004 | Satoh et al. | 713/175 |
| 2006/0047972 A1 * | 3/2006 | Morais | 713/190 |
| 2006/0265563 A1 * | 11/2006 | Goettfert et al. | 711/164 |
| 2007/0011429 A1 * | 1/2007 | Sangili et al. | 711/203 |
| 2007/0147611 A1 * | 6/2007 | Stone et al. | 380/239 |
| 2007/0300078 A1 * | 12/2007 | Ochi et al. | 713/189 |
| 2008/0285747 A1 * | 11/2008 | Kim et al. | 380/44 |
| 2009/0007104 A1 * | 1/2009 | Zimmer et al. | 718/1 |

* cited by examiner

*Primary Examiner* — Vivek Srivastava
*Assistant Examiner* — Jayesh Jhaveri
(74) *Attorney, Agent, or Firm* — Beyer Law Group LLP

(57) ABSTRACT

Methods and devices for increasing or hardening the security of data stored in a storage device, such as a hard disk drive, are described. A storage device provides for increased or hardened security of data stored in hidden and non-hidden partitions of a storage medium in the device. An algorithm may be utilized for deriving a key that is used to encrypt or decrypt text before it is read from or written to the hard disk. The algorithm accepts as input a specific media location factor, such as an end address or start address of the block where the text is being read from or written to, and a secret key of the storage component. The output of the algorithm is a final key that may be used in the encryption and decryption process. Thus, in this manner, the final key is dependent on the location of the block where the data is being written or read, thereby making it more difficult to tamper with the data, which may be stored in a hidden or non-hidden partition of a hard disk.

20 Claims, 5 Drawing Sheets

SECURITY-ENHANCED STORAGE DEVICES USING MEDIA LOCATION FACTOR IN ENCRYPTION OF HIDDEN AND NON-HIDDEN PARTITIONS

BACKGROUND OF THE INVENTION

1. Field of the Invention

The present invention relates generally to computer storage devices and related software. More specifically, the invention relates to methods and devices for increasing the security of data stored in such devices.

2. Description of the Related Art

The design of highly secure hard disk drives is becoming increasingly important, particularly for applications that require high security levels, such as in the enterprise and government markets. Many hard disk drive (HDD) and other mass storage device manufacturers are attempting to make "security enhanced" hard disk drives to make data stored on them increasingly secure. In addition, standards groups and consortiums, such as the Trusted Computing Group (TCG), SNIA, IEEE, OASIS, and IETF, are working on solutions for secure and trusted storage.

Standard symmetric encryption techniques, such as AES and DES, and modes of encryption, such as ECB and CBC, that may be applied to specific portions of the disk drive, for example the portion sometimes referred to as the hidden partition (typically accessible only by the HDD firmware/controller) as well as to non-hidden segments, such as the user addressable space (UAS), have been found to be inadequate and may still allow for tampering. If one can modify or alter, for example, the hidden partition portion of a trusted storage device, a malicious user can easily compromise and fully control the device. Conventional encryption of a hidden and non-hidden partition is not sufficient to achieve high levels of security. Further enhancements to the security of trusted storage devices are always needed.

For example, one weakness in hidden partitions encrypted using conventional symmetric encryption is the ability to switch owners (an "owner" being any user or application allowed to access a specific partition) of a block of data such that the owner may now access a block of data in a partition that originally did not belong to that owner, while another owner may have access to the first owner's block. When this type of owner switch occurs, standard encryption techniques presently used for hidden partitions do not prevent access by users to unauthorized data.

The mode of encryption used to encrypt portions of a storage medium, in particular the hidden partition, is very important given that the overall performance of the HDD depends on it. For example, using Cipher-Block-Chaining (CBC) would require re-encrypting the entire hidden partition to make a single change to it. Another mode is ECB (Electronic Code Book) but this does not provide as strong security as CBC, although it may be more efficient. Another possibility is encrypting each block in the hidden partition using CBC, which may keep the performance drawback within reasonable limits. However, even using CBC on each sector in the hidden partition, attacks to the hidden partition are still possible, such as switching owners of a block as described above.

It would be desirable to have strong protection of hidden and non-hidden partition portions of a storage medium, even when the medium is not under strict control of the storage device controller. That is, when the storage media component of, for example, a hard disk device, is detached from the device and temporarily not under direct control of the device controller (firmware), the hidden partition of the storage media component should not be vulnerable to tampering or corruption.

SUMMARY OF THE INVENTION

The present invention provides for increased or hardened security of data stored in hidden and non-hidden partitions of a storage medium in a storage device, such as a hard disk drive. An algorithm may be utilized for deriving a key that is used to encrypt or decrypt text before it is read from or written to the hard disk. In one embodiment, the algorithm accepts as input a specific media location factor, such as an end address or start address of the block where the text is being read from or written to, and a secret key of the storage component. The output of the algorithm is a final key that may be used in the encryption and decryption process. Thus, in this manner, the final key is dependent on the location of the block where the data is being written or read, thereby making it more difficult to tamper with the data, which may be stored in a hidden or non-hidden partition of a hard disk.

One aspect of the present invention is a method of writing data to a storage device. Plaintext, such as security metadata, is received at a controller or other component of the storage device. A characteristic of the text with respect to a storage medium where it will be written to in the storage device is obtained. In various embodiments, this characteristic may be the start address or end address of the block or segment in the storage medium where the text will be written to. This characteristic, together with a key derived or provided by the storage device, may be used as inputs to an algorithm to derive a final or actual key. The final key is used to encrypt the plaintext to create a ciphertext which is written to the storage medium. In this manner, encryption of the data may depend, in part, on a unique characteristic of the data with respect to the storage medium. In one embodiment the storage device key and the characteristic are combined using a logic operation. In another embodiment, the characteristic may be a unique characteristic of the data other than a location descriptor, such as the start or end addresses. In other embodiments the text may be written to a hidden partition of the storage medium or to a non-hidden partition.

In another aspect of the present invention, a method of reading data from a storage device is described. Ciphertext is retrieved from a storage medium in a storage device and a characteristic of the ciphertext with respect to the storage medium is obtained. An encryption key may be derived from a key associated with the storage device and the characteristic using an algorithm of the storage device. The ciphertext may be decrypted using the encryption key, thereby obtaining a plaintext representation of the ciphertext. In this manner, decryption of the ciphertext may be dependent, in part, on a unique characteristic of the ciphertext. In other embodiments the text may be read from a hidden partition of the storage medium or from a non-hidden partition.

Another aspect of the present invention is a storage device having hardened security for hidden and non-hidden partitions. The device includes a processor, a host device interface, a mass storage medium for storing data, and a local memory. The local memory may store a key derivation module and an encryption module that accepts as input a derived key and the text being written to or read from the storage medium. It may also store a key associated with the storage device, wherein the key derivation module may accept as input the key associated with the device and unique data related to the text and may perform a logic operation on these inputs to derive a final key. The mass storage media of the storage device has a specific partition that is used only by the storage device and not by a host device referred to as a hidden partition. Other portions of the storage medium, such as the user addressable space (UAS), may be referred to as non-hidden partitions. The increased or hardened security of text being stored on the storage medium may apply to both hidden and non-hidden partitions. The security of the text and metadata stored in the storage medium may be enhanced using the unique data related to the text. In one embodiment the unique data is location-related data associated with a location in the mass storage media where the text is written to or read from. In one embodiment the location-related data is a start address and in another embodiment it may be the end address of a block in the storage medium associated with the text.

The methods of the present invention may be implemented, at least in part, by hardware and/or software. For example, some embodiments of the invention provide computer programs embodied in machine-readable media. The computer programs include instructions for controlling one or more devices to perform the methods described herein.

BRIEF DESCRIPTION OF THE DRAWINGS

References are made to the accompanying drawings, which form a part of the description and in which are shown, by way of illustration, particular embodiments.

DETAILED DESCRIPTION OF SPECIFIC EMBODIMENTS

Reference will now be made in detail to specific embodiments of the invention including the best modes contemplated by the inventors for implementing the invention. Examples of these specific embodiments are illustrated in the accompanying drawings. While the invention is described in conjunction with these specific embodiments, it will be understood that these embodiments are not intended to limit the invention to the described embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In addition, well known process operations have not been described in detail in order to not unnecessarily obscure the invention.

Methods and apparatus for improving the security of data stored on a hard disk drive are described in the various figures. Specifically, storage devices and methods executed therein are directed to decreasing the vulnerability of security-related metadata and other data stored in a hard disk, such as in a portion referred to as a hidden partition, as well as in non-hidden portions. As described above, standard encryption processes and algorithms for data stored on a hard disk may be ineffective in preventing certain forms of tampering and corruption. Although the present invention is described using a hard disk drive as an example of a storage component and illustrates the methods using the hidden partition, the devices and methods described herein may be applied to any suitable storage system that has a storage medium, a controller and firmware, and may be applied to non-hidden partitions of a storage medium, such as the user addressable space, as described below.

Figure 1:
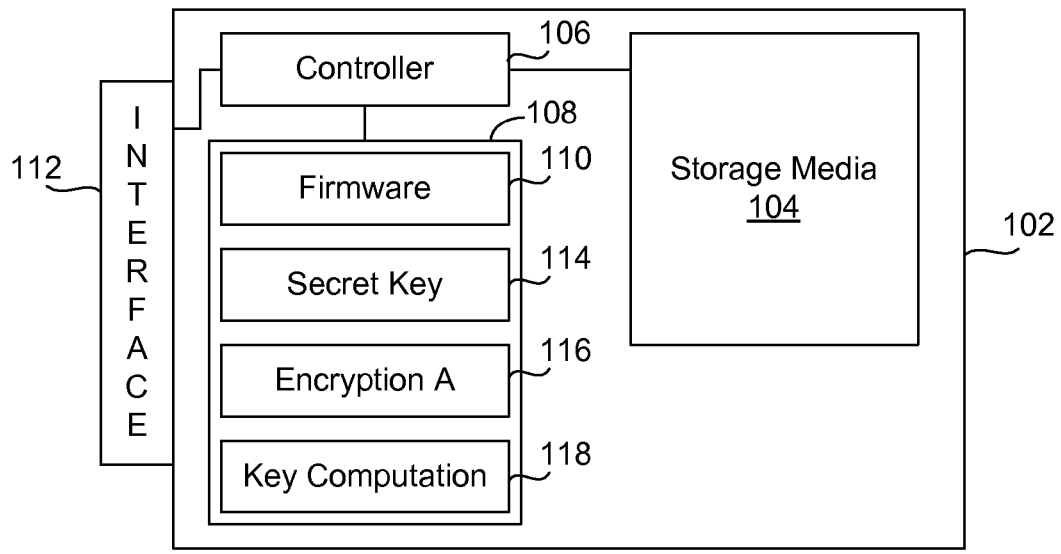
FIG. 1 is a logical block diagram of a hard disk drive in accordance with one embodiment of the present invention.

FIG. 1 is a logical block diagram of a hard disk drive in accordance with one embodiment of the present invention. A hard disk drive device 102 has a mass storage media component 104 connected to a controller or processor 106. Storage media 104 may be one or more hard disks (e.g., platter-type memory) or, for other types of storage device or media, such as flash memory. In some embodiments, storage media component 104 may be physically removable from device 102. Controller 106 has access to local memory 108 (not part of storage media 104) storing various data used for the operation of disk drive 102. The data is listed here for ease of reference and described in more detail in the discussion below. Firmware 110 is used by controller 106 to perform operations in device 102 and is typically not part of or accessed by the operating system or other software of the host device, e.g., a PC (not shown) using disk drive 102. Firmware 110 may also control communications with the host device via interface 112. Also stored in local memory 108 is a secret key 114 of disk drive 102 used in a symmetric encryption/decryption process described below. Encryption module 116, as noted, may utilize a symmetric key encryption algorithm, such as AES or its predecessor DES. Encryption module 116 accepts as input a key derived from a key computation or algorithm 118, which also accepts as input data specific to the text or data being encrypted or decrypted and stored in storage media 104.

Figure 2:
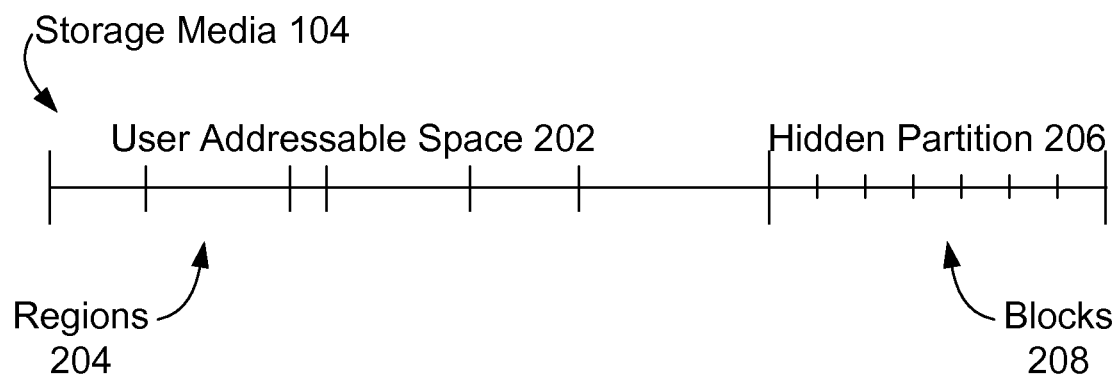
FIG. 2 is a diagram of storage media shown at a granular level in accordance with one embodiment of present invention.

Storage media 104 is shown generally, although at a more granular level in FIG. 2. A user addressable space (UAS) 202 is the primary storage area used to store data for the host device. Although implementation may differ from one type of drive to another, generally UAS 202 is segmented into regions 204 which may vary in length, and where a region may be used, for example, to hold data for a particular application or user and may have its own segment (in UAS 202) for storing security and authentication data (not shown). Generally, regions 204 may be accessed by the host device and is considered a non-hidden portion of the storage medium. UAS 202 and other non-hidden partitions typically comprise the vast majority of storage area in hard disk drive 102 (e.g., 99% of the storage capacity). The portion of storage media 104 used to illustrate the present invention is a hidden partition 206. This partition of storage media 104 is not known to the host device; that is, the host device O/S does not know that partition 206 exists and, therefore, does not access it, nor would it be able to even if the host device operating system did become aware of it.

Hidden partition 206 generally stores security-related data, such as the encryption keys for hard disk drive 102 and secret keys for storage regions 204 in UAS 202. In one embodiment, partition 206 is divided or segmented into equal length blocks 208 (sample block sizes), each having a start and end address which essentially define the block and are typically unique characteristics of the block. Data in blocks 208 is preferably encrypted, even though it is unknown and inaccessible to external software and hardware components. Some groups, such as the Trusted Computing Group (TCG), believe that hard disk drive 102 cannot be a fully trusted and secure device unless hidden partition 206 is fully encrypted. For example, the TCG has a Storage Working Group that focuses on standards for secure storage and has recognized the need for secure and trusted storage. This requirement of the TCG (one example of the importance given to keeping data in hidden partition 206 secure) is described in TCG Storage Architecture Core Specification (Version 1.0, rev 0.9, May 24, 2007 Draft), incorporated by reference in its entirety and for all purposes. Sections of particular relevance include Section 2.2.3 discussing the Trusted Peripheral (TPer) and Security Providers (SP) contained within a TPer.

Figure 3:
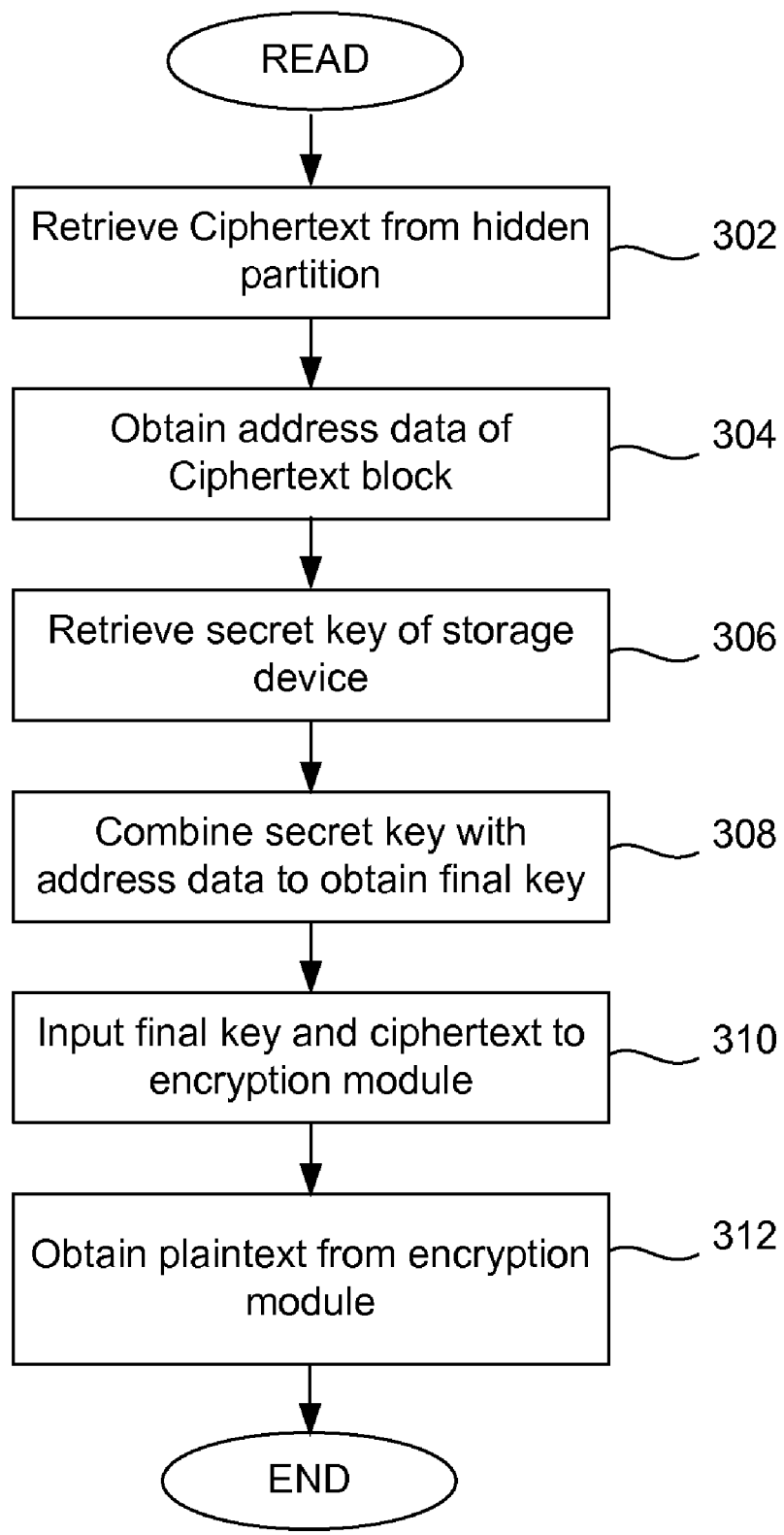
FIG. 3 is a flow diagram of a process of reading data from a block in a hidden partition in a disk drive in accordance with one embodiment.

FIG. 3 is a flow diagram of a process of reading security and related metadata from a block in hidden partition 206 in accordance with one embodiment. The order of the steps is not intended to imply a strict order of the process. Some of the steps may be done in a different order than that shown and some of the steps may not be needed in other embodiments or more steps may be needed that are not shown here. A read operation of the described embodiment is initiated and performed by controller 106. As noted above, the host device or any entity other than the disk drive itself does not and, generally, cannot access or perform operations on partition 206. Controller 106 may operate under firmware 110. When drive 102 is enabled or powered up, at step 302 a controller retrieves text or, more generally, data, for example, binary data or data in other formats, from a hidden partition. In one embodiment, the text or data (herein referred to as "text" but may include any suitable format of data) is encrypted, creating ciphertext, and has a fixed length. This ciphertext is stored in a block which has a specific start address and end address in the hidden partition. At step 304 the controller obtains this address data, which only the controller of the disk drive is able to do. At step 306 the controller also obtains secret encryption key 114 from local memory 108. This is encryption key 114 specifically associated or belonging to the disk drive device and, in one embodiment, may be calculated from a secret value in local memory 108 or which may be stored in hidden partition 206.

At step 308 controller may use key computation module 118 to combine the secret key obtained at step 306 with address data obtained at step 304 in order to calculate or otherwise derive a final key, that is, the actual key which may be used in the decryption process described below. The techniques used to combine the secret key and address data may vary widely. In one example, a logic operation, such as an XOR, NAND, or NOR, may be used. The type of operation used to combine or derive may depend on the formats or other characteristics of each data item. In one embodiment, the address data may be the start or begin address of the block of ciphertext. In another embodiment, it may be the end address of the block. In yet other embodiments, another location-dependent factor may be used, such as a value that is itself derived from the start and end addresses, or a block mid-point address may be used. The address data may be combined with the secret key of the device at step 308. In another embodiment, a secret value in the drive, instead of the device's secret key, may also be used. The key, per se, may not be needed because no encryption or decryption is taking place at this step. As described, the derivation may be viewed as a calculation or other type of combination or meshing of the two values.

At step 310 the ciphertext and the final key derived at step 308 are input to encryption routine 116. As noted above, the encryption routine may be any suitable symmetric key encryption algorithm. One of the objectives is that the actual key used be different for each block of ciphertext, and this may be achieved since the address data used to derive the actual key is necessarily different for each block. The output from the encryption routine is a plaintext or decrypted version of the ciphertext which is transmitted to the controller at step 312. The controller may then use the data as needed to access host device data in UAS 202 or other non-hidden partitions, at which stage a process of reading data from the hidden partition is complete.

Figure 4:
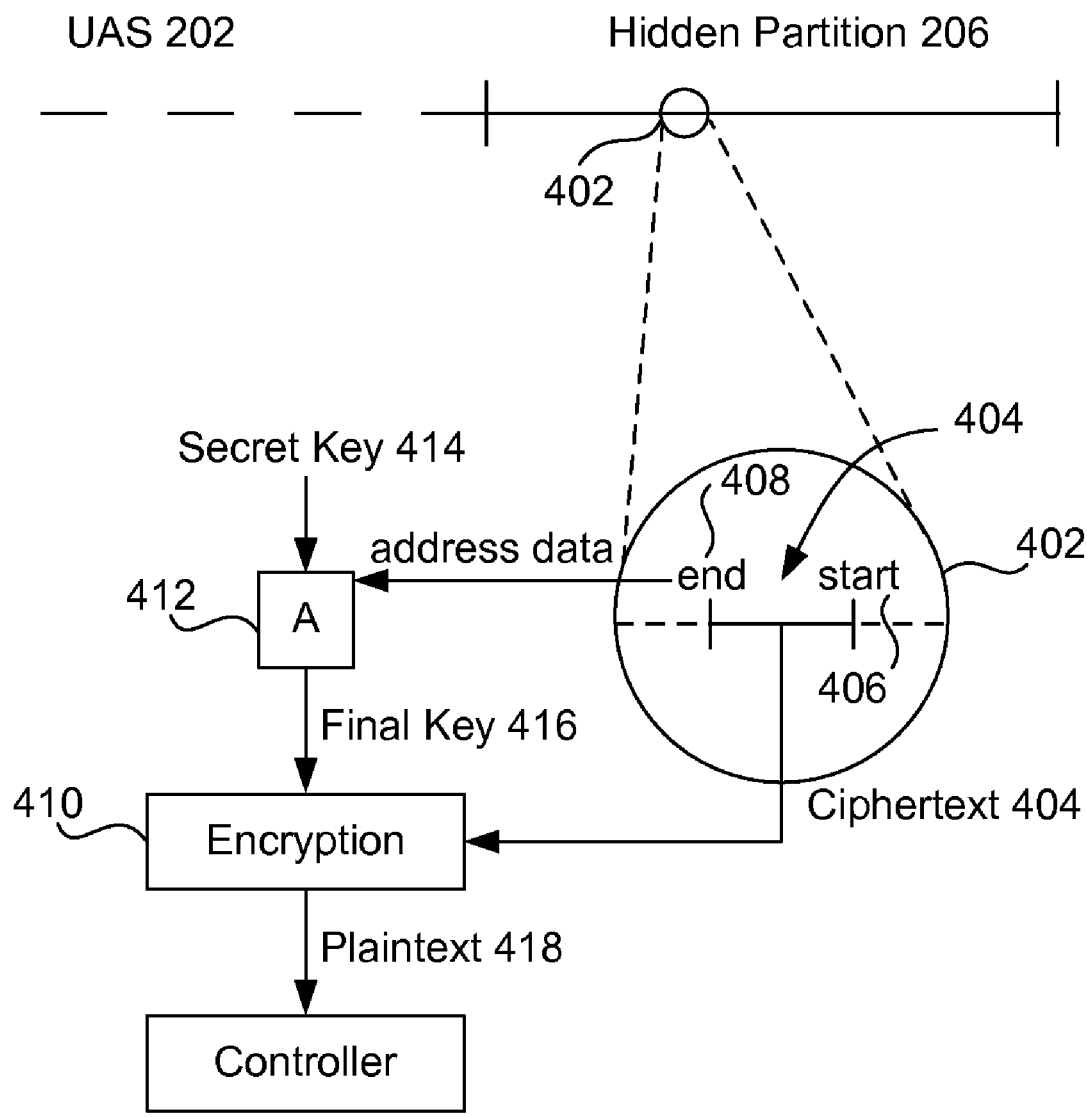
FIG. 4 is a block diagram showing another view or perspective of a read operation in accordance with one embodiment.

FIG. 4 is a block diagram showing another view or perspective of a read operation as described above in accordance with one embodiment. A segment 402 of hidden partition 206 contains a block of text 404 (as seen in the enlarged view) having a start address 406 and an end address 408. In another example, block of text 404 may have been from a non-hidden partition of the storage medium and have had a start and end address. Text block 404 is ciphertext that is input to an encryption module 410. In one embodiment, end address 408 or, in another embodiment, start address 406, is input to a key algorithm, labeled as A, and referenced as item 412. Another input to key algorithm 412 may be a secret key 414 generated by the hard disk drive component (not shown). A final or actual key 416 is created by key algorithm 412 and is one of the inputs to encryption module 410 along with ciphertext 404. The output from encryption module 410 is plaintext 418 which is transmitted to a controller 420 of the disk drive.

Figure 5:
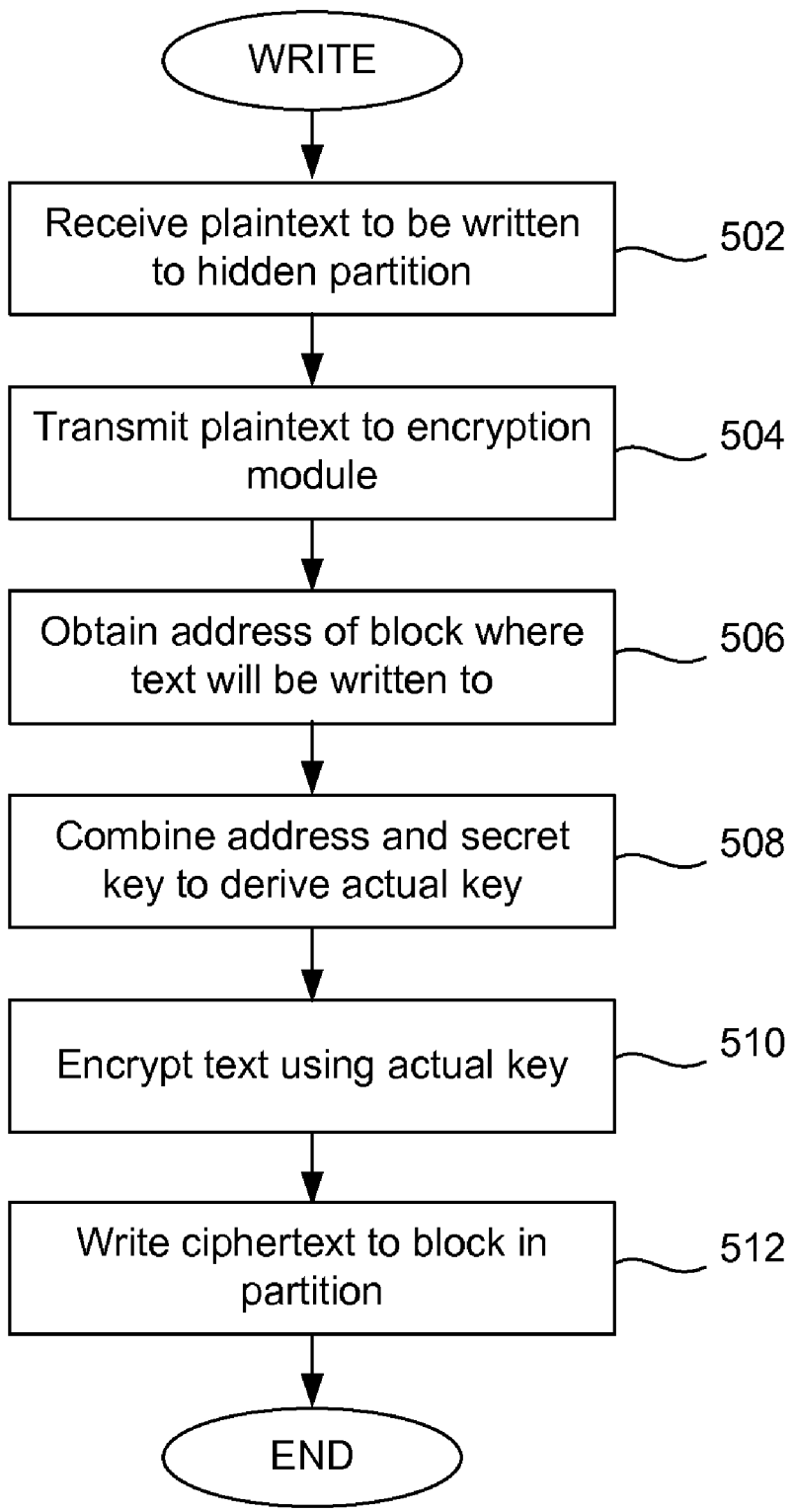
FIG. 5 is a flow diagram of a process of writing data to a hidden partition in a disk drive in accordance with one embodiment.

FIG. 5 is a flow diagram of a process of writing text to a hidden partition in a disk drive in accordance with one embodiment. The order of the steps provided in the flow diagram is not intended to imply a strict order of the process. Some of the steps may be done in a different order than that shown and some of the steps may not be needed in other embodiments or more steps may be needed that are not shown here. At step 502 the controller of a disk drive receives plaintext to be written to the hidden partition of a disk drive. In another example, the text may be written to a non-hidden partition, such as the UAS, of the storage medium. At step 504 the plaintext is transmitted to an encryption module. The controller of the disk drive obtains the address of the block where the plaintext will be written to at step 506. As described above, the address may be the start address, an end address, or other unique address relating to the block. At step 508 the address data and a secret key of the disk drive are combined to derive an actual or final key. The logic for performing this operation may vary widely. In one embodiment, the logic or calculation may be the same as the logic or calculation used to combine the data in the read operation described in FIG. 3 at step 310, such as NAND, XOR, and the like. At step 510 the plaintext is encrypted using the final key by an encryption module in the firmware of the disk drive as described above. Finally, at step 512 the ciphertext outputted from the encryption module is written by the controller to the hidden partition or non-hidden partition at the designated block.

Figure 6:
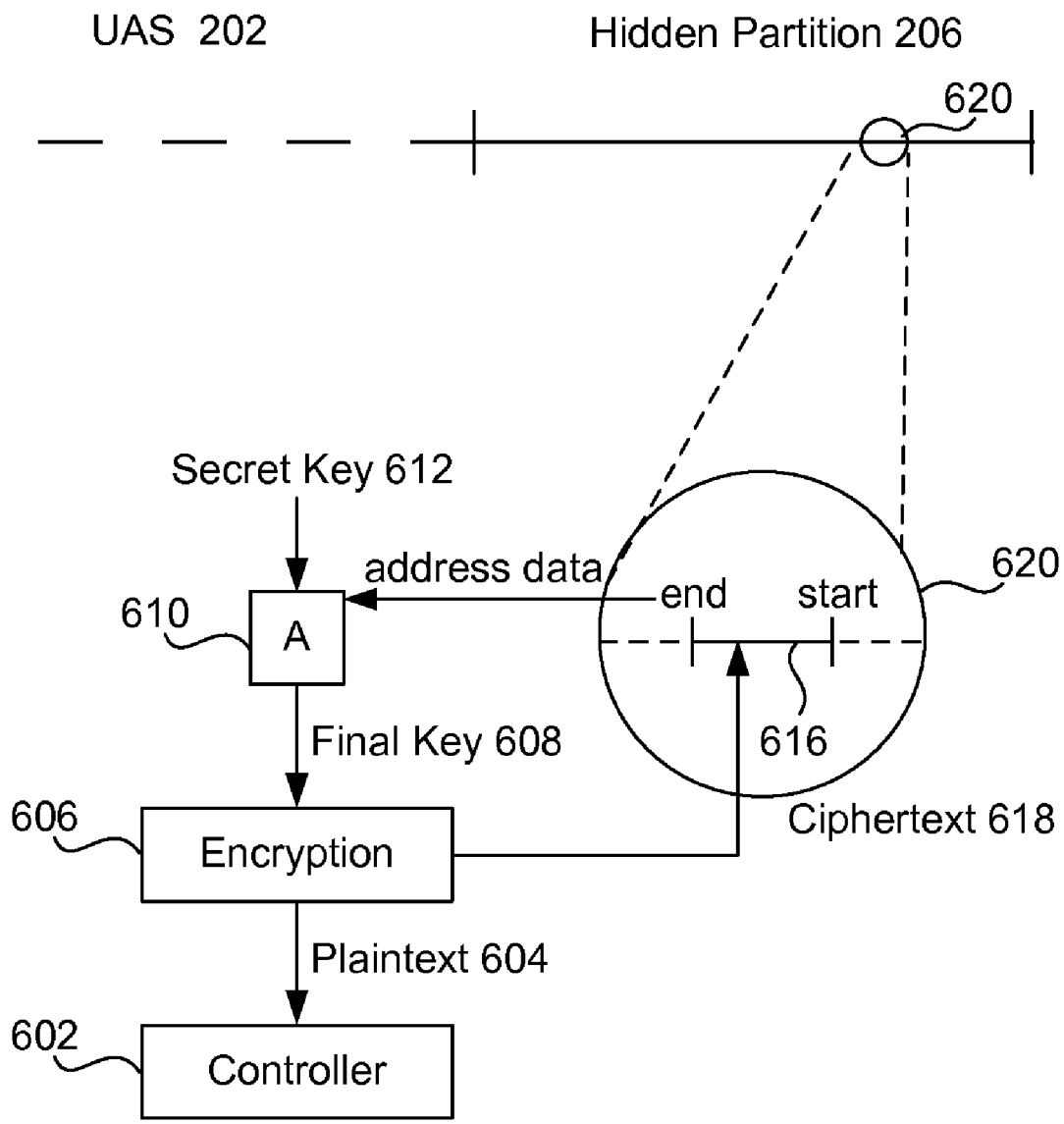
FIG. 6 is a block diagram showing another view or perspective of a write operation as described above in accordance with one embodiment.

FIG. 6 is a block diagram showing another view or perspective of a write operation as described above in accordance with one embodiment. For illustrative purposes, a write operation to the hidden partition is shown, although the same process may be applied to non-hidden portions of memory, such as the UAS. A controller 602 of a disk drive transmits plaintext 604 intended to be written to the drive's hidden partition 206 to encryption module 606. Encryption module 606 may also accept as input a final or actual key 608. Key 608 is derived from a key algorithm module A, referenced as item 610. The algorithm may also accept as input a secret key 612, which may be generated by the hard disk drive. Another input to key algorithm module 610 is address data 614, such as a start address, end address, mid-point address, and the like, associated with a block 616 in hidden partition 206. Encryption module 606 outputs ciphertext 618 which is written to block 616, shown in an enlarged view of a segment 620 of hidden partition 206.

In one embodiment, a hardware module, such as a chip or chip set, may automatically encrypt the data or plaintext being written to a hard disk and decrypt the ciphertext obtained from the disk. In another embodiment, firmware 110 of the disk drive contains additional instructions for encrypting and decrypting the data being read from and written to the disk drive. The firmware that controls the reading and writing operations for the disk drive may invoke the encryption/decryption functions on the data before writing the data to the disk or outputting the data to the host device. In another embodiment, a hybrid implementation may be utilized in which the disk drive has a hardware module, such as a chip, for cryptographic functions and the firmware of the disk drive calculates the final key, as described above, by combining the actual key and the address data. This final key and the data may be passed to the hardware cryptographic module which performs the encryption/decryption processes. As is known in the art, hardware implementations for cryptographic functions ("dedicated crypto modules") are typically preferred over software implementations because of significantly lower latency.

Finally, although various advantages, aspects, and embodiments of the present invention have been discussed herein with reference to various example implementations, it will be understood that the scope of the invention should not be limited by reference to such advantages, aspects, and embodiments. Rather, the scope of the invention should be determined with reference to the appended claims.

What is claimed is:

1. A method of writing security-related data to a hidden partition in a storage medium, the security data for use by a storage device to access data in a non-hidden partition comprising:
   receiving security-related data to be written to the hidden partition in the storage medium, wherein the security-related data is used to access host device data in the non-hidden partition;
   obtaining one of a hidden partition end address or a hidden partition start address of the security-related data;
   deriving a first key using the one of a hidden partition end address or a hidden partition start address and a secret key of the storage device;
   encrypting the security-related data using the first key thereby creating a ciphertext; and
   writing the ciphertext to the storage medium;
   wherein encryption of the security-related data depends on one of the hidden partition end address or the hidden partition start address of the data with respect to the storage medium.

2. A method as recited in claim 1 wherein deriving the first key further comprises combining the one of the hidden partition end address or the hidden partition start address characteristic and the secret key using a logic operation.

3. A method as recited in claim 1 wherein the secret key is provided by the storage device.

4. A method as recited in claim 1 wherein decryption of the ciphertext is dependent on the first key.

5. A method as recited in claim 1 wherein the hidden partition end address or a hidden partition start address are unique characteristics of the data.

6. A method as recited in claim 1 wherein the storage device operates within a host device.

7. A method of reading security data from a hidden partition in a storage medium, the security data for use by a storage device to access data in a non-hidden partition comprising:
   retrieving security-related ciphertext from the hidden partition in the storage medium;
   obtaining a one of a hidden partition end address or a hidden partition start address of the ciphertext;
   deriving a first key from a secret key of the storage device and one of the hidden partition end address or the hidden partition start address; and
   decrypting the security-related ciphertext using the first key, thereby obtaining a plaintext representation of the ciphertext; and
   using the plaintext to access host device data in the non-hidden partition;
   wherein decryption of the security-related ciphertext is dependent on one of the hidden partition end address or the hidden partition start address of the ciphertext.

8. A method as recited in claim 7 wherein deriving the first key further comprises combining the one of the hidden partition end address or the hidden partition start address with characteristic and the secret key using a logic operation.

9. A method as recited in claim 7 wherein encryption of the text is dependent on the first key.

10. A method as recited in claim 7 wherein the storage device operates within the host device.

11. A storage device comprising:
    a processor;
    a host device interface;
    a mass storage media for storing data; and
    a local memory storing a first key derivation module that accepts as input a secret key and one of a hidden partition end-address or a hidden partition start-address, an encryption module that accepts as input a first key and text, and a secret key associated with the storage device.

12. A storage device as recited in claim 11 wherein the mass storage media has a hidden partition that is used only by the storage device and not by a host device.

13. A storage device as recited in claim 12 wherein the hidden partition stores security data that relates to the security of data stored in a user addressable space of the mass storage media.

14. A storage device as recited in claim 13 wherein the security data in the hidden partition is enhanced using the text.

15. A storage device as recited in claim 12 wherein the encryption module outputs ciphertext to the specific partition of the storage media during a write operation and wherein the encryption module receives plaintext from the processor.

16. A storage device as recited in claim 12 wherein the encryption module outputs plaintext to the processor during a read operation and wherein the encryption module receives ciphertext from the specific partition of the storage media.

17. A storage device as recited in claim 11 wherein the first key derivation module outputs a first key by performing a logic operation on the key and one of a hidden partition end-address or a hidden partition start-address the text.

18. A storage device as recited in claim 11 wherein the storage device is a hard disk drive.

19. A microchip for writing security-related data to a hidden partition in a storage medium, the security data for use by a storage device to access data in a non-hidden partition, the microchip comprising:
    instructions for receiving security-related data to be written to the hidden partition in the storage medium, wherein the security-related data is used to access host device data in the non-hidden partition;

instructions for obtaining one of a hidden partition end address or a hidden partition start address of the security-related data;

instructions for deriving a first key using the one of a hidden partition end address or a hidden partition start address and a secret key of the storage device;

instructions for encrypting the security-related data using the first key thereby creating a ciphertext; and instructions for writing the ciphertext to the storage medium;

wherein encryption of the security-related data depends on one of the hidden partition end address or the hidden partition start address of the data with respect to the storage medium.

20. A microchip for reading security data from a hidden partition in a storage medium, the security data for use by a storage device to access data in a non-hidden partition, the microchip comprising:

instructions for retrieving security-related ciphertext from the hidden partition in the storage medium;

instructions for obtaining a one of a hidden partition end address or a hidden partition start address of the ciphertext;

instructions for deriving a first key from a secret key of the storage device and one of the hidden partition end address or the hidden partition start address;

instructions for decrypting the security-related ciphertext using the first key, thereby obtaining a plaintext representation of the ciphertext; and instructions for using the plaintext to access host device data in the non-hidden partition;

wherein decryption of the security-related ciphertext is dependent on one of the hidden partition end address or the hidden partition start address of the ciphertext.

* * * * *